United States Patent
Zimmermann et al.

(10) Patent No.: US 9,169,536 B2
(45) Date of Patent: Oct. 27, 2015

(54) PROCESS FOR PROVIDING NOBLE METAL-CONTAINING MIXTURES FOR RECOVERING NOBLE METALS

(75) Inventors: Klaus Zimmermann, Alzenau (DE); Robert Hartmann, Kleinostheim (DE); Oswald Kinz, Langenselbold (DE); Matthias Grehl, Goldbach (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 86 days.

(21) Appl. No.: 14/111,416

(22) PCT Filed: Apr. 12, 2012

(86) PCT No.: PCT/EP2012/056659
§ 371 (c)(1),
(2), (4) Date: Oct. 11, 2013

(87) PCT Pub. No.: WO2012/140128
PCT Pub. Date: Oct. 18, 2012

(65) Prior Publication Data
US 2014/0026715 A1    Jan. 30, 2014

Related U.S. Application Data

(60) Provisional application No. 61/476,580, filed on Apr. 18, 2011.

(30) Foreign Application Priority Data

Apr. 13, 2011  (DE) .......................... 10 2011 016 860

(51) Int. Cl.
*C22B 11/02*  (2006.01)
*F23G 7/00*  (2006.01)

(52) U.S. Cl.
CPC .............. *C22B 11/02* (2013.01); *C22B 11/021* (2013.01); *C22B 11/023* (2013.01); *F23G 7/003* (2013.01); *F23G 7/008* (2013.01); *Y02W 30/54* (2015.05)

(58) Field of Classification Search
CPC .... C22B 11/021; C22B 11/02; C22B 11/023; F23G 7/008; F23G 7/003
See application file for complete search history.

(56) References Cited

U.S. PATENT DOCUMENTS

| 4,553,488 A * | 11/1985 | Giuseppe ...................... 588/320 |
| 4,687,514 A | 8/1987 | Renner et al. |
| 7,108,839 B2 | 9/2006 | Boricha et al. |
| 8,188,329 B2 * | 5/2012 | Nowottny et al. ............ 588/321 |
| 2008/0295749 A1 | 12/2008 | Nowottny et al. |

FOREIGN PATENT DOCUMENTS

| DE | 32 23501 C1 | 12/1985 |
| DE | 9420410 U1 | 2/1995 |
| JP | 2004-292912 A | 10/2004 |
| JP | 2009-222288 A | 10/2009 |
| KR | 2003-0067421 A | 8/2003 |

OTHER PUBLICATIONS

Kazuji, Oka et al. "Method for Recovering High Purity Rhodium from Rhodium-Containing Metal Waste or the Like". Japanese Patent 2004494912 A. Oct. 21, 2004. Machine translation.*
International Search Report for Application No. PCT/EP2012/056659 dated Jun. 1, 2012 (in English).

* cited by examiner

*Primary Examiner* — George Wyszomierski
*Assistant Examiner* — Tima M McGuthry Banks
(74) *Attorney, Agent, or Firm* — Smith, Gambrell & Russell, LLP

(57) ABSTRACT

The invention relates to the provision of noble metal-containing mixtures for a process for processing them by heating the mixture, preferably for processing them by means of an ashing process. This provision is characterized by the following measures: (a) moistening of the noble metal-containing mixture to be processed, (b) introduction of the moistened noble metal-containing mixture into at least one container which serves as diffusion barrier for water, and (c) introduction of the loaded container into a heat-resistant chamber together with at least one upper refractory mat. The noble metal-containing mixture is preferably moistened in the presence of a porous material and the chamber is closed by means of a heat-resistant covering. The invention further provides a processing process comprising the provision of noble metal-containing mixtures and also the heat-resistant chamber loaded with noble metal-containing mixtures itself. The process of the invention enables simple, clean recovery of noble metals in high yield from noble metal-containing mixtures.

36 Claims, No Drawings

PROCESS FOR PROVIDING NOBLE METAL-CONTAINING MIXTURES FOR RECOVERING NOBLE METALS

The process described here allows clean processing, preferably recovery or purification, of noble metals from noble metal-containing organic and inorganic mixtures with at the same time a high yield of processed noble metals.

Noble metals are all metals which have a positive standard potential, i.e. are more noble than the element hydrogen. These include both the classical jewelry metals gold (Au) and silver (Ag) and also the platinum group metals ruthenium (Ru), rhodium (Rh), palladium (Pd), osmium (Os), iridium (Ir) and platinum (Pt) itself.

PRIOR ART

In the isolation, in particular the recycling, of noble metals from noble metal-containing mixtures, wet chemical processes and high temperature processes are used at present.

The wet chemical processes for noble metal recovery follow, in particular, two main routes:

One route is the electrochemical, cathodic deposition of the noble metals in elemental form from liquid mixtures in which the noble metals have previously been, generally for the purpose of removing impurities, brought into solution under chemically extreme conditions, for example by addition of strong mineral acids such as concentrated hydrochloric acid or aqua regia or, usually toxic, complexing agents such as cyanides in the recovery of gold. The cathodic deposition follows further processing of the cathode sludge using various hydrometallurgical processes.

Here, the cathode sludge, which is generally a mixture of various noble metals, is brought into solution again by addition of acids, alkalis, salts or complexing agents. The individual noble metals are separated from this solution and from one another by means of a plurality of successive selective solution and precipitation processes.

Large amounts of aqueous wastes having a high hazard potential are formed here and require proper, usually complicated and costly disposal.

Likewise, considerable amounts of acidic gases, e.g. hydrogen chloride and nitrogen oxides, are liberated in these processes and have to be removed from the waste air from the plants by use of scrubbers.

The wet chemical alternative to electrolytic recovery is the separation of noble metals from liquid phases by precipitation. Here, the noble metals which are likewise present in solution are, in the first step, precipitated from the aqueous phase by addition of particular reagents, generally complexing agents or reducing agents, resulting in them precipitating either in elemental form or as sparingly soluble compounds.

Such a procedure is selected, for example, in DE 3 223 501 C where rhodium is precipitated from an aqueous solution by addition of elemental or reducible tellurium at temperatures in the range from 120 to 200° C.

After the precipitate has been separated off by means of various methods (cementation, filtration, pressure precipitation, etc.), the precipitate is then, especially when the precipitates are metal compounds and not elemental metals, processed further by means of a pyrometallurgical route.

Pyrometallurgical processes include all processes in metal winning and also purification and upgrading in which melt phases are used. These include, for instance, melt purifications, roasting, calcinations, distillation, liquation, etc. These processes are extremely energy-intensive, especially in the case of noble metals which have relatively high melting points which are, apart from silver, always above 1000° C., in the case of the platinum metals even above 1500° C.

One alternative to the wet chemical processes for recovering noble metals is provided by high-temperature processes in which the noble metal-containing mixtures are, in a first step, subjected to thermal decomposition with parallel oxidation of the undesirable impurities. Such a process is known in industry as "ashing".

These processes are used first and foremost in the processing of "dross". The term "dross" refers to non-metallic materials, in particular mixtures, in which solid, infusible noble metal-containing mixtures having a high proportion of organics are present. They can be, for example, waste products from the production of the noble metals or the further processing thereof, for example to produce catalysts.

Particularly in purely metal-organic mixtures, ashing occurs virtually without leaving a residue as far as the organic component of the mixture is concerned, i.e. the ash contains virtually exclusively the noble metals in elemental form.

Ashing processes have the advantage over wet chemical processes that they produce considerably smaller amounts of residues, for instance contaminated solutions, which require special disposal. However, a disadvantage is the technical complexity and the sometimes high energy usage in these processes.

The technical complexity of the processes is due partly to the requirements of particular handling of a number of noble metal-organic compounds which are highly ignitable or explosive.

The problems in relation to the combustibility and tendency to explode of some noble metal-organic compounds is countered in industry by ashing being carried out not in a single high-temperature process but stepwise in a plurality of successive high-temperature subprocesses, with pyrolysis and oxidative decomposition of the organic components proceeding separately from one another. Such approaches may be found, for example, in US 2008/0295749 A1, JP 2009-22288 A and optionally in DE 9420410 U1.

The principle of the multichamber system in carrying out ashing comprises, in a first step, partial pyrolysis, usually associated with densification or volume contraction of the starting mixture, with the hazardous substances being converted in a low-oxygen atmosphere into less hazardous intermediates.

In a subsequent process step, the (virtually residue-free) oxidative decomposition of the former organic phase finally takes place.

The advantage of such a separation of the two subprocesses is that very high concentrations of an oxidizing gas (usually oxygen) can be used in the (after-)combustion chamber for the oxidative decomposition, which are necessary for the oxidation reaction to proceed virtually to completion.

However, such high oxygen concentrations increase the risk of explosion in the pyrolysis of some noble metal-organic compounds, e.g. in the case of triphenylphosphine complexes of rhodium, and also some inorganic noble metal compounds such as the carbonyl complexes of some platinum metals, for which reason they tend to be counterproductive in the first step.

The disadvantage of a multichamber system for ashing solid noble metal-containing mixtures is clearly the increased outlay for apparatus in these systems.

A further difficulty in the thermal recovery of noble metals is the particular form of the products obtained: during ashing, a not inconsiderable proportion of the noble metal formed is obtained in the form of microparticles or nanoparticles which are not infrequently pyrophoric and on leaving the plant represent a considerable hazard potential and also costly losses in the yield of the recovered metal. To minimize such losses, various routes can be followed:

One possibility is complicated filtration of the flue gases.

A further possibility is direct melting of the metal dusts formed during ashing by use of temperatures which are sometimes significantly above the melting point of the noble metals. The process described in KR 10 2003 0 067 421 A, for example, makes recourse to such a procedure; in this, platinum (melting point: 1768° C.) is isolated from wastes at temperatures in the range from 1500 to 2000° C. in a high-pressure reactor.

A further disadvantage of the recovery of noble metals by ashing is the impurities which are present in addition to the noble metals in the ash and have to be removed separately in further process steps, which increases the complication of the total process.

Particularly in the case of noble metal-containing mixtures having a high proportion of inorganic material, such impurities occur to an increased extent. Depending on the composition of the mixtures, attempts are made to minimize the proportion of oxygen, carbon, nitrogen or sulphur in the ash by conversion of the elements into volatile products by introduction of various oxidizing or reducing process gases (e.g.: $O_2$ as oxidant, CO as reducing gas) or by introduction of solid oxidants or reducing agents. These measures are employed, for example, in the document JP 2004-292912 A. There, carbon dust is introduced into the system and is converted during heating into CO which has a strongly reducing effect on oxidic constituents and removes the oxygen from the system in the form of the volatile product $CO_2$.

Owing to the inadequacies of the previous purely thermal processes for recovering noble metals from solid noble metal-containing mixtures, combined processes in which sometimes complicated overall processes thermal substeps are combined with wet chemical substeps are frequently used in industry. Examples of such a procedure are given in the documents U.S. Pat. No. 7,108,839 B2 and JP 2004-292912 A.

U.S. Pat. No. 7,108,839 B2 describes a process in which a coating of an organic platinum compound on silica gel is removed by a combined overall process made up of thermal and wet chemical steps. Here, the organic platinum compound is firstly oxidized at elevated temperatures before being passed to a multistage wet chemical sequence for further processing of the intermediate. In JP 2004-292912 A, on the other hand, a wet chemical treatment of a rhodium-containing noble metal dross precedes the ashing process. Although both processes guarantee an increased product purity in the recovery of the noble metal, they are very complicated. Proceeding from the prior art, it is an object of the present invention to provide a process which does not have the disadvantages of the processes of the prior art.

This object is achieved by the subjects of the claims.

This is made possible by a particular form of the provision of the noble metal-containing mixtures for a process for processing noble metal-containing mixtures by heating the mixture, preferably for an ashing process, which makes it possible to obtain the noble metals of the mixture in elemental form and relatively high yield after only a single process step.

DESCRIPTION OF THE INVENTION

According to the invention, the provision of the noble metal-containing mixtures for a process for processing noble metal-containing mixtures by heating of the mixture is characterized by the following measures:

moistening of the noble metal-containing mixture to be processed, introduction of the moistened noble metal-containing mixture into at least one container which serves as diffusion barrier for water, introduction of the loaded container into a heat-resistant chamber together with at least one upper refractory mat.

The heat-resistant chamber is advantageously closed by means of a heat-resistant cover. In this way, the noble metal losses are reduced further.

The process for processing noble metal-containing mixtures by heating of the noble metal mixture is preferably ashing.

The noble metal-containing mixtures provided by the present invention for a process for processing noble metal-containing mixtures, preferably for ashing, can contain noble metals both in free form and in the form of chemical compounds, with both organic and inorganic noble metal compounds being able to be present in the mixture.

In one embodiment, the noble metal-containing mixture contains only a single noble metal either in free form or in the form of organic or inorganic compounds.

In a further embodiment, the noble metal-containing mixture contains a plurality of different elements in free form or in the form of organic or inorganic compounds.

In a preferred embodiment of the invention, the noble metal-containing mixture consists of dross, i.e. it contains mostly organic noble metal compounds.

The noble metal-containing mixtures are preferably residues or waste products which originate from the process for producing the noble metals concerned or the further processing thereof, e.g. to produce heterogeneous or homogeneous catalysts.

However, the noble metal-containing mixtures can also be mixtures which originate from the use of noble metals or products produced therefrom and are contaminated with the noble metals or compounds thereof during the same.

In a further embodiment of the invention, the noble metal-containing mixtures are noble metal-containing liquids, preferably solutions or suspensions.

A further preferred embodiment of the invention comprises the recovery of noble metals from exhausted activated carbon catalysts.

Many noble metal-containing mixtures tend to ignite easily and frequently to decompose, even in an explosive manner. For this reason, handling of these mixtures presents a particular challenge, in particular in the case of processes in which these mixtures are exposed to high temperatures in the presence of strong oxidants, as is the case, for example, during ashing.

Such readily ignitable noble metal compounds are, for example, noble metal complexes with carbon monoxide or triphenylphosphine as complexing ligands, for example in the case of the chlorotris(triphenylphosphine)rhodium(I) complex, known as the Wilkinson catalyst, which is frequently used for hydrogenation or isomerization in organic chemistry.

The recovery of noble metals by ashing of noble metal-containing mixtures in the conventional processes generally comprises two subprocesses:

Firstly, the nonmetal components are pyrolysed, i.e. decomposed thermally. Here, cleavage of the bonds between the noble metals and the organic radicals attached thereto occurs. The noble metals are converted into their free form.

This step requires high temperatures. However, the presence of relatively large amounts of oxidizing gases such as oxygen is disadvantageous because it frequently leads to spontaneous, sometimes explosive, ignition of the noble metal compounds or the thermal decomposition products.

The second subprocess of ashing is oxidation of the pyrolysed intermediates. Here, these are converted into volatile end products (in the case of organic compounds these are mostly $CO_2$ and $H_2O$). As a result, an ash which in the ideal case is admixed with a high proportion of free noble metals remains as residue.

For this subprocess, high concentrations of the oxidizing gas oxygen are, on the other hand, necessary for the combustion to proceed to completion.

Different process conditions in respect of the presence of the oxidizing gas oxygen are required for the two substeps. For this reason, a two-stage procedure is frequently selected in conventional ashing processes, with the plants used for this purpose being multichamber systems which are at least two-chamber systems and have a pyrolysis chamber and an after-combustion chamber, which maximizes the technical complexity of the system as a result of the outlay in terms of apparatus which results.

This outlay in terms of apparatus can be considerably reduced by means of the present invention by pyrolysis and oxidation not proceeding sequentially as in conventional processes but in parallel in a single chamber and in a single step.

This is achieved by means of a particular form of the provision of the noble metal-containing mixtures to be processed for a subsequent process in which these mixtures are heated, with the noble metals preferably being recovered or processed further, e.g. purified. Such a process in which the noble metal-containing materials are heated with the objective of metal recovery is preferably ashing.

Apart from the provision of the noble metal-containing mixtures for a process in which these mixtures are subsequently heated, preferably ashed, the present invention also encompasses such a process for metal recovery or processing which makes use of said provision of the noble metal-containing mixtures.

Due to the particular form of the provision of the noble metal-containing mixtures, the subsequent ashing, for example, proceeds so effectively that the total process for recovery of metals from the noble metal-containing mixtures can likewise be considerably simplified.

In a preferred embodiment, the process of the invention for metal recovery or processing dispenses with the use of wet chemical steps before ashing.

In a further preferred embodiment, the process of the invention for metal recovery or processing dispenses with the use of wet chemical steps after ashing.

In a particularly preferred embodiment, the process of the invention for metal recovery or processing dispenses with the use of any wet chemical steps before and after ashing.

Moistening of the Noble Metal-Containing Mixture

According to the invention, the noble metal-containing mixture is moistened. This is generally effected by addition of water. This moistening is advantageous because sudden ignition of the noble metal-containing mixtures, and an associated strong evolution of flue gas, can be suppressed. Furthermore, the water vapour which is given off during heating serves to make the furnace atmosphere inert. In this way, explosive gas mixtures and undesirable explosions can be avoided in the heating phase.

Spontaneous combustion of the mixtures in noble metal recovery is not only a problem in terms of safety but would also lead, due to the intensive formation of flue gases which would occur and the entrainment of fine noble metal particles by these flue gases, to considerable decreases in the noble metal yield of the recovery process.

Materials which can absorb and possibly also store water (tissues, rags, etc.) are typically present in noble metal-containing mixtures or dross. A porous or water-absorbent material is preferably moistened with water and then added to the noble metal-containing mixture. A further addition of water can take place after blending of the mixture. The noble metal-containing mixtures are preferably sprayed with the water to effect wetting. Water-moist exhausted activated carbon catalysts can generally absorb a proportion of water which exceeds their own weight.

The total water content of the noble metal-containing mixture is in the range from 5 to 90% by weight (in each case based on the total weight of the noble metal-containing mixture). The total water content is preferably in the range from 20 to 80% by weight (based on the total weight). This total water content includes the water stored in the porous material (e.g. in the exhausted moist activated carbon catalysts) and also the additional water added, for example after blending.

The Porous Material

The moistening of the noble metal-containing mixture advantageously takes place in the presence of a porous, preferably water-absorbent, material. However, the addition of the porous material is optional. If no liquid noble metal-containing residues or no activated carbon catalysts laden with organic solvents are present in the noble metal-containing mixture, the addition of a porous material can be omitted.

The porous material can be either organic (i.e. carbon-containing) or inorganic in nature.

Preference is given to using an inorganic, non-combustible porous material. This can function as water storage and as adsorbent for organic solvents. The porous material should therefore have a high uptake capacity for water or for organic solvents. It serves to absorb noble metal-containing liquids, tar-like moist distillation residues and also noble metal-containing inks and pastes in the recovery process. The blending or treatment with the porous material enables such residues to be processed and metered more readily.

As porous inorganic material, it is possible to use, for example, sodium aluminosilicate, bentonite, zeolite, alumina, expanded clay or commercial cat litter. The inorganic material is preferably a ceramic material, with silicate-ceramic, oxide-ceramic or non-oxide-ceramic materials, preferably in powder form, being possible.

Preferred oxide-ceramic materials are, for example, magnesium oxide (MgO), aluminium oxide ($Al_2O_3$), zirconium dioxide ($ZrO_2$), titanium(IV) oxide ($TiO_2$), zinc oxide (ZnO), aluminium titanate ($Al_2TiO_5$) or barium titanate ($BaTiO_3$) or mixtures thereof.

Preferred nonoxide-ceramic materials are, for example, silicon carbide (SiC), boron carbide ($B_4C$), boron nitride (BN), aluminium nitride ($AlN_x$) or silicon nitride ($SiN_x$) or mixtures thereof. Mixtures of oxide-ceramic and nonoxide-ceramic materials can also be used. The materials should generally have a high internal and/or external surface area.

If the noble metal-containing mixtures are liquids, the porous inorganic material is firstly impregnated with these liquids. In this case, it is possible to use not only the above-mentioned pulverulent adsorbents but also refractory materials, glass wool, ceramic insulation materials such as chamotte or rock wool, etc. The residues treated with refractory materials are processed in the same way as the noble metal-containing solids mixtures.

In a further embodiment, it is possible to use a carbon-containing material, for example activated carbon, wood charcoal, filter charcoal or sawdust as porous organic material. The carbon-containing porous material, too, should have a high external and/or internal surface area.

In the processing of residues which contain water-containing, moist activated carbon catalysts, it may be possible to omit the further addition of water. However, if the mixture additionally contains liquid noble metal residues containing organic solvents, further porous material is generally added as adsorbent for organic solvents and the mixture may be additionally moistened. Exhausted activated carbon catalysts (loaded, for example, with Pt and/or Rh), can, according to the invention, be blended with both moistened ceramic materials and moistened activated carbon. Here too, the stepwise release of water from the porous material prevents spontaneous ignition of the mixture or the formation of explosive gas mixtures, to which the residues of organic solvents which are frequently present in the catalysts, in particular, can contribute.

The addition of porous material depends on the nature and composition of the noble metal-containing mixtures. In a mixture of noble metal-containing material, porous material and water produced according to the invention, the proportion of the porous material is in the range from 0 to 70% by weight based on the total weight of the mixture (without water loading). The proportion of the porous material is preferably in the range from 0 to 60% by weight based on the total weight of the mixture (without water loading).

The addition of the porous, preferably water-absorbent materials is advantageous for various reasons. In the process of noble metal recovery, they have a moderating function: they guarantee uniform thermal decomposition of the noble metal-containing mixtures and prevent random combustion or rapid outgassing of the components of the mixture. In addition, they serve as water storage which gradually releases the water as the temperature increases. As a result, heating of the mixture of noble metal-containing mixtures and inorganic material forms an atmosphere over the latter which, due to its high moisture content, minimizes the risk of explosion of combustible gases.

Introduction of the Mixture into a Container which Serves as Diffusion Barrier for Water After blending of the noble metal-containing mixture with water and optionally a porous material, the mixture is introduced into at least one container which serves as diffusion barrier for water.

In a preferred embodiment, the mixture is introduced into precisely one such container. In a further preferred embodiment, the mixture is introduced into a plurality of containers, where an inner container is sealed within outer containers.

The containers act as diffusion barrier for water or water vapour and prevent rapid, unhindered exit of water from the mixture. They therefore prevent rapid drying which could lead to spontaneous ignition of the mixture. They prevent or considerably delay the exit of water from the mixture. In addition, rapid drying of the mixture is inhibited further by the slowed release of the absorbed water in the porous material.

The containers likewise prevent fire-promoting, wide-area contact of the mixture with oxygen in the surroundings.

Preference is given to each container consisting of a plastic. In a particular embodiment of the invention, the plastic has been shaped to form a closable bag.

Particularly preferred plastics are halogen-free polymers, preferably chlorine- and fluorine-free polymers. This is because the decomposition of halogen-containing polymers would lead to liberation of highly corrosive and toxic gases at high temperatures.

In one embodiment of the invention, the material of which the containers are made is a polymer which contains no further elements in addition to carbon, hydrogen and optionally oxygen. In a particularly preferred embodiment of the invention, the polymer is polyethylene (PE) or polypropylene (PP).

After introduction of the mixture into the container, the latter is closed. In a preferred embodiment, closure of the containers is effected by means of a tie made of a halogen-free plastic. In a particularly preferred embodiment, closure of the containers is effected by means of a commercial cable tie made of polyethylene. The closure points of the containers function as a type of overpressure valve. If the internal pressure in the bag exceeds a particular level due to the continual evolution of decomposition gases, part of the gases escapes through the closure point. On the other hand, the continual evolution of decomposition gases hinders the entry of gases from the environment, e.g. oxygen, into the interior of the containers because of the prevailing pressure gradient between the interior of the containers and the surroundings around these containers.

In this way, the containers make it possible for the first part of the ashing process to proceed, as described above, in a low-oxygen environment.

After a particular heating phase and above a particular process temperature, the containers no longer withstand the ambient conditions and themselves decompose, as a result of which they allow increased access of oxygen to the mixture from the surroundings. In this way, optimal conditions for the second part of ashing, viz. the oxidative conversion of the pyrolysis intermediates into volatile end products, are created.

According to the invention, the one or more containers which have been filled with the mixture and closed by means of the plastic tie are introduced into a heat-resistant chamber.

Refractory Mats

According to the invention, the loaded containers are introduced together with at least one upper refractory mat into a heat-resistant chamber.

The task of this upper refractory mat is to guarantee gentle combustion of the mixture below the mat and to subject the flue gases evolved to filtration, as a result of which very fine noble metal dusts in the microparticle and nanoparticle range formed during ashing are prevented from being emitted into the environment in an uninhibited way. The at least one upper refractory mat in this way serves as absorber for the noble metal dusts formed during ashing.

In a preferred embodiment of the invention, the bottom of this chamber is additionally lined with at least one lower refractory mat.

The task of this lower refractory mat is to prevent the noble metals formed in the ashing process from baking or diffusing into the bottom of the heat-resistant chamber. However, this lower refractory mat is optional.

The fibre mats which are based on oxides or mixed oxides of Si, Al, Ca, Mg and Zr and are adequately known from furnace construction, e.g. glass wool mats, rockwool mats and other ceramic insulation materials, preferably serve as materials for the refractory mats.

In a preferred embodiment, the mats have a bulk density of from 20 to 150 mg/m$^3$, preferably from 70 to 130 kg/m$^3$ and particularly preferably from 80 to 100 kg/m$^3$.

The thickness of the mat is preferably not more than 50 mm, more preferably not more than 25 mm and particularly preferably not more than 10 mm.

The temperature which the fibre material can withstand without appreciable sintering should be from 800 to 1800° C., preferably from 1000 to 1400° C. and particularly preferably from 1150 to 1300° C.

Heat-Resistant Chamber

The one or more containers containing the noble metal-containing mixtures and also the at least one upper refractory mat are accommodated in a heat-resistant chamber during the process in which the containers and the mixture present therein are heated.

A heat-resistant chamber loaded in this way is itself preferably not a furnace but a container which can be accommodated in a furnace.

In a preferred embodiment, the heat-resistant chamber is a cuboidal box. In a further preferred embodiment, the heat-resistant chamber is cylindrical.

The material of which the heat-resistant chamber is made is preferably a corrosion-resistant steel alloy. In a particularly preferred embodiment of the invention, the heat-resistant chamber consists of a chromium-nickel steel having additions of molybdenum.

According to the invention, the heat-resistant chamber preferably has one or more openings which can optionally be closed during the ashing process. These openings serve as valve openings for gas exchange between the interior of the heat-resistant chamber and the surroundings and prevent establishment of super-atmospheric pressure in this chamber.

According to the invention, the heat-resistant chamber can optionally be closed by means of a lid. In this case, the lowest noble metal losses are achieved. Furthermore, closure of the chamber by means of a lid can prevent noble metal-containing residues from being taken out.

In a preferred embodiment of the invention, the lid consists of the same material as the heat-resistant chamber itself. Closure of the heat-resistant chamber by means of such a lid makes it possible to establish thermal equilibrium in the chamber, which equilibrium is disturbed only slightly by the few valve openings.

The covered, heated heat-resistant chamber then functions as a uniform heat radiator from all directions in the chamber. This guarantees a uniform chemical reaction process over the entire dimensions of the mixture in the heat-resistant chamber.

In a preferred embodiment, such a chamber has a maximum volume of 500 l, more preferably 250 l and particularly preferably 100 l.

Process for Processing Noble Metal-Containing Mixtures

The present invention further provides a process for processing noble metal-containing mixtures, in which these mixtures are heated and the process includes the abovementioned provision of the noble metal-containing mixtures.

In a preferred embodiment of the invention, the process comprises a single step in which the noble metal-containing mixtures are heated and a loaded heat-resistant chamber as described above is introduced into a furnace.

Any furnace which can accommodate a heat-resistant chamber having the indicated volume and the indicated shape can serve as furnace.

In a preferred embodiment, the furnace has an activated carbon filter which filters very fine noble metal particles leaving the heat-resistant chamber with the flue gas from the exhaust air.

The process temperature in the step in which the noble metal-containing mixtures are heated is preferably not more than 1050° C., more preferably not more than 950° C. and particularly preferably not more than 850° C.

In preferred embodiments of the invention, the temperature should not go below a minimum temperature of less than 600° C., more preferably less than 700° C. and particularly preferably less than 750° C.

The process time of the step in which the noble metal-containing mixtures are heated is preferably not more than 10 hours, more preferably not more than 9 hours and particularly preferably not more than 8 hours.

In a preferred embodiment, the process for processing noble metal-containing mixtures is used to recover noble metals from mixtures comprising one or more of the following noble metals in free form or in the form of compounds: ruthenium, rhodium, palladium, silver, osmium, iridium, platinum and gold.

In a further preferred embodiment, the process is used for recovering the noble metals ruthenium, rhodium, palladium and platinum or mixtures thereof.

EXAMPLES

Example 1

A mixture consisting of the components indicated in Table 1 in the amounts indicated is moistened with about 500 ml of water and introduced into a polyethylene (PE) bag.

TABLE 1

| Material | Weight introduced [kg] | Proportion of the total amount [% by weight] |
|---|---|---|
| Triphenylphosphane (PPh$_3$) | 0.100 | 0.66 |
| Paper | 0.372 | 2.47 |
| Filter cartridges based on PE | 0.534 | 3.55 |
| Activated carbon (loaded with Rh) | 5.00 | 33.25 |
| Water (adsorbed on activated carbon) | 6.00 | 39.90 |
| KOH | 0.050 | 0.33 |
| Ethanol | 0.025 | 0.17 |
| Toluene | 0.025 | 0.17 |
| Protective gloves (plastic) | 0.098 | 0.65 |
| Work gloves (latex) | 0.030 | 0.20 |
| PE sack | about 0.3 | 1.99 |
| [Rh(acac)(CO)(PPh$_3$)] CAS: 25470-96-6 | 2.505 (Rh content: 0.5001) | 16.66 |
| Total weight | 15.039 | 100 |
| Total weight (without water loading) | 9.039 | | acac: acetylacetato;
Ph: phenyl;
CO: carbonyl

The total water content of the mixture is 6.5 kg (6.0 kg from activated carbon and 0.5 kg of additional moistening) and is thus 43.2% by weight (based on the total weight). The proportion of the porous material (in this case activated carbon) is 55.3% by weight (based on the total weight without water loading and moistening). The bag is closed by means of a commercial cable tie made of PE and introduced into a heat-resistant chamber made of corrosion-resistant chromium-nickel steel (with molybdenum additions) having 6 ventilation openings on each side below the lid. The bottom of the heat-resistant chamber is lined with a refractory mat. The PE bag loaded with the mixture in the heat-resistant chamber is covered tightly with a second refractory mat. The heat-resistant chamber is subsequently closed by means of a lid (likewise made of chromium-nickel steel with Mo additions).

The loaded heat-resistant chamber is introduced into a commercial ashing furnace and there exposed to temperatures in the range 750-850° C. for a period of about 8 hours. After the process is complete, the combustion residue and the two refractory mats are taken from the heat-resistant chamber and the proportion of rhodium present therein is determined.

The weight of the residue taken out is: 8.306 kg.

The weight of the covering material taken out (refractory mats above and below the loaded container) is: 0.736 kg.

The analytical result after fine preparation of the residue gives: 5.932% of Rh. This corresponds to a content by mass of 8.306 kg×5.932%=0.4927 kg of Rh.

The analytical result after fine preparation of the covering material gives: 0.786% of Rh. This corresponds to a content by mass of 0.736 kg×0.786%=0.0058 kg of Rh.

This corresponds to a recovery of 98.52% in the residue and of 99.68% in the residue and covering material together.

Example 2

A mixture having the composition shown in Table 1 is subjected to an ashing process as in Example 1 except that the heat-resistant chamber is not closed with a lid during ashing and the use of an upper covering mat is dispensed with.

The weight of the residue taken out is: 8.278 kg.

The analytical result after fine preparation of the residue gives: 5.578% of Rh. This corresponds to a content by mass of 8.278 kg×5.578%=0.4617 kg of Rh.

This corresponds to a recovery of 92.17%.

Example 3

A mixture as indicated in Table 2 is subjected to an ashing process as in Example 1. The additional moistening is likewise carried out using 500 ml of water. The heat-resistant chamber is this time closed with a lid during ashing as in Example 1. The container containing the noble metal-containing mixture is covered with an upper covering mat in the heat-resistant chamber.

The total water content of the mixture is 6.5 kg (6.0 kg from activated carbon and 0.5 kg additional moistening) and is thus 26% by weight (based on the total weight). The proportion of the porous material (activated carbon) is 26.3% by weight (based on the total weight without water loading and without moistening).

TABLE 2

| Material | Weight introduced [kg] | Proportion of the total amount [% by weight] |
| --- | --- | --- |
| Triphenylphosphane (PPh$_3$) | 0.320 | 1.28 |
| Paper | 0.249 | 1.00 |
| Filter cartridges based on PE | 0.564 | 2.26 |
| Activated carbon (loaded with Pt/Rh) | 5.00 | 20.00 |
| Water (adsorbed on activated carbon) | 6.00 | 24.00 |
| KOH | 0.050 | 0.20 |
| Ethanol | 0.025 | 0.10 |
| Toluene | 0.025 | 0.10 |
| Protective gloves (plastic) | 0.307 | 1.23 |
| Work gloves (latex) | 0.030 | 0.12 |
| PE sack | about 0.3 | 1.20 |
| [Rh(acac)(CO)(PPh$_3$)] CAS: 25470-96-6 | 2.505 (of which: 0.500 Rh) | 10.02 |
| [Pd(PPh$_3$)$_4$] CAS: 14221-01-3 | 4.502 (of which: 0.401 Pd) | 18.01 |
| [RuCl$_2$(PPh$_3$)$_3$] CAS: 15529-49-4 | 2.350 (of which: 0.251 Ru) | 9.40 |
| Pt[(ViMe$_2$Si)$_2$O]$_2$ + Pt[(ViMe$_2$Si)$_2$O] [ViMe$_2$SiOSiMe$_2$OH] CAS: 81032-58-8 | 2.775 (of which: 0.573 Pt) | 11.10 |
| Total weight | 25.0 | 100 |
| Total weight (without water loading) | 19.0 | | acac: acetylacetato,
Ph: phenyl;
CO: carbonyl;
Vi: vinyl;
Me: methyl

The weight of the residue taken out is 9.687 kg. The analytical result after fine preparation of the residue gives the following values for the individual noble metals (Table 3):

TABLE 3

| Noble metal | Mass of noble metal found in [kg] | Proportion of noble metal in the total mass of product [kg] | Recovery of the noble metal in the ash [% by wt.] |
| --- | --- | --- | --- |
| Rh | 0.493 | 5.085 | 98.52 |
| Pd | 0.396 | 4.088 | 98.72 |
| Ru | 0.246 | 2.538 | 97.96 |
| Pt | 0.566 | 5.848 | 98.86 |

Example 4

A mixture as indicated in Table 4 is subjected to an ashing process as in Example 2. The additional moistening of the mixture is carried out using 500 ml of water. The heat-resistant chamber is, as in Example 2, not closed with a lid during ashing. The container containing the noble metal-containing mixture is also not covered with an upper covering mat in the heat-resistant chamber before the chamber is introduced into the furnace.

The total water content of the mixture is 6.5 kg (6.0 kg from activated carbon and 0.5 kg of additional moistening) and is thus 25.8% by weight (based on the total weight). The proportion of porous material (activated carbon) is 26.1% by weight (based on the total weight without water loading and without moistening).

TABLE 4

| Material | Weight introduced [kg] | Proportion of the total amount [% by weight] |
| --- | --- | --- |
| Triphenylphosphane (PPh$_3$) | 0.320 | 1.28 |
| Paper | 0.276 | 1.00 |
| Filter cartridges based on PE | 0.532 | 2.26 |

TABLE 4-continued

| Material | Weight introduced [kg] | Proportion of the total amount [% by weight] |
|---|---|---|
| Activated carbon (loaded with Pt and Rh) | 5.00 | 20.00 |
| Water (adsorbed on activated carbon) | 6.00 | 24.00 |
| KOH | 0.050 | 0.20 |
| Ethanol | 0.025 | 0.10 |
| Toluene | 0.025 | 0.10 |
| Protective gloves (plastic) | 0.319 | 1.23 |
| Work gloves (latex) | 0.04 | 0.12 |
| PE sack | about 0.26 | 1.20 |
| [Rh(acac)(CO)(PPh$_3$)] CAS: 25470-96-6 | 2.499 (of which: 0.499 Rh) | 10.02 |
| [Pd(PPh$_3$)$_4$] CAS: 14221-01-3 | 4.622 (of which: 0.412 Pd) | 18.01 |
| [RuCl$_2$(PPh$_3$)$_3$] CAS: 15529-49-4 | 2.375 (of which: 0.254 Ru) | 9.40 |
| Pt[(ViMe$_2$Si)$_2$O]$_2$ + Pt[(ViMe$_2$Si)$_2$O] [ViMe$_2$SiOSiMe$_2$OH] CAS: 81032-58-8 | 2.806 (of which: 0.579 Pt) | 11.10 |
| Total weight | 25.149 | 100 |
| Total weight (without water) | 19.149 | | acac: acetylacetato;
Ph: phenyl;
CO: carbonyl;
Vi: vinyl;
Me: methyl

The weight of the residue taken out is 9.246 kg. The analytical result after fine preparation of the residue gives the following values for the individual metals (Table 5):

TABLE 5

| Noble metal | Mass of noble metal found in [kg] | Proportion of noble metal in the total mass of product [kg] | Recovery of the noble metal in the ash [% by wt.] |
|---|---|---|---|
| Rh | 0.460 | 4.973 | 92.18 |
| Pd | 0.387 | 4.187 | 94.00 |
| Ru | 0.233 | 2.521 | 91.89 |
| Pt | 0.549 | 5.935 | 94.70 |

In Table 6, the results from Examples 3 and 4 are compared.

TABLE 6

| Noble metal | Yield in [% by wt.] in the case of an open heat-resistant chamber | Yield in [% by wt.] in the case of a closed heat-resistant chamber | Difference in the yield [% by wt.] |
|---|---|---|---|
| Rh | 92.18 | 98.52 | 6.34 |
| Pd | 94.00 | 98.72 | 4.72 |
| Ru | 91.89 | 97.96 | 6.07 |
| Pt | 94.70 | 98.86 | 4.15 |

It can clearly be seen from this Table 6 that without exception better yields of the noble metals are obtained from the ash when the heat-resistant chamber is closed by means of a lid during the ashing process and the container containing the noble metal-containing mixture is covered with an upper refractory mat in the heat-resistant chamber.

Example 5

A noble metal-containing mixture (weight: 9 kg) which consists essentially of the components indicated in Table 2 (but without Pt- and Rh-loaded activated carbon) is mixed with 5 kg of inorganic cat litter (commercial, obtainable in home and garden stores). The resulting mixture is then moistened with 3.5 kg of water and subsequently introduced into a polyethylene (PE) bag. The total weight of the noble metal-containing mixture is 17.5 kg. The water content of the mixture is 20% by weight (based on the total weight). The proportion of the porous material (cat litter) is 35.7% by weight (based on the total weight without water loading).

The bag is closed by means of a commercial PE cable tie and introduced into a heat-resistant chamber made of corrosion-resistant chromium-nickel steel (with molybdenum additions) having 6 ventilation openings on each side below the lid. The bottom of the heat-resistant chamber is lined with a refractory mat. The PE bag loaded with the mixture is covered with a second refractory mat in the heat-resistant chamber. The heat-resistant chamber is subsequently closed by means of a heat-resistant lid.

The loaded heat-resistant chamber is introduced into a commercial ashing furnace and there exposed to temperatures in the range 750-850° C. for a period of about 8 hours. After the process is complete, the combustion residue and the two refractory mats are taken from the heat-resistant chamber and the proportion of noble metal present therein is determined. The noble metals Pt, Pd and Rh with total recoveries in each case of >98.5% are obtained.

Example 6

A mixture consisting of 5 kg of an Rh-containing distillation residue is mixed with 3.5 kg of inorganic alumina which has been moistened beforehand with 1 kg of water and is subsequently introduced into a polyethylene (PE) bag. The total weight of the noble metal-containing mixture is 9.5 kg. The water content of the mixture is 10.5% by weight (based on the total weight). The proportion of the porous material (alumina) is 41.2% by weight (based on the total weight without addition of water).

The bag is closed by means of a commercial PE cable tie and introduced into a heat-resistant chamber made of corrosion-resistant chromium-nickel steel (with molybdenum additions) having 6 ventilation openings on each side below the lid. The further processing is carried out as described in Example 5. After the process is complete, the combustion residue and the two refractory mats are taken from the heat-resistant chamber and the proportion of noble metal therein is determined. The noble metal Rh is obtained with a total recovery of >98.5%.

Example 7

A mixture of 5 kg of a Pd-containing activated carbon laden with organic residues is mixed with 3.5 kg of inorganic alumina which has been moistened beforehand with 1 kg of water and subsequently introduced into a polyethylene (PE) bag. The total weight of the noble metal-containing mixture is 9.5 kg. The water content of the mixture is 10.5% by weight (based on the total weight). The proportion of the porous material (alumina) is 41.2% by weight (based on the total weight without water loading).

The bag is closed by means of a commercial PE cable tie and introduced into a heat-resistant chamber made of corrosion-resistant chromium-nickel steel (with molybdenum additions) having 6 ventilation openings on each side below the lid. The further processing is carried out as described in Example 6. The noble metal Pd is obtained with a total recovery of >99.5%.

The invention claimed is:

1. Provision of noble metal-containing mixtures for a process for processing noble metal-containing mixtures by heating the mixture, wherein the provision comprises:
   moistening of the noble metal-containing mixture to be processed, wherein the noble metal-containing mixture has a total water content in the range from 5 to 80% by weight,
   introduction of the moistened noble metal-containing mixture into at least one container to form a loaded container, wherein the at least one container serves as a diffusion barrier for water,
   introduction of the loaded container into a heat-resistant chamber together with at least one upper refractory mat, wherein the at least one upper refractory mat covers the loaded container.

2. Provision of noble metal-containing mixtures according to claim 1, which further comprises closure of the chamber by means of a heat-resistant covering.

3. Provision of noble metal-containing mixtures according to claim 1, wherein the process for processing the noble metal-containing mixtures is ashing.

4. Provision of noble metal-containing mixtures according to claim 1, wherein the noble metal-containing mixture contains organic noble metal compounds, inorganic noble metal compounds, elemental noble metals or mixtures thereof.

5. Provision of noble metal-containing mixtures according to claim 1, wherein the noble metal-containing mixture contains elemental metal or metal compounds of one or more metals from the group consisting of ruthenium, rhodium, palladium, silver, osmium, iridium, platinum and gold.

6. Provision of noble metal-containing mixtures according to claim 1, wherein the noble metal-containing mixture is blended with a porous material before being introduced into the container which serves as diffusion barrier for water.

7. Provision of noble metal-containing mixtures according to claim 6, wherein a proportion of the porous material is in the range from greater than 0 to 70% by weight based on the total weight of the mixture without water loading.

8. Provision of noble metal-containing mixtures according to claim 7, wherein the proportion of the porous material is in the range from greater than 0 to 60% by weight based on the total weight of the mixture without water loading.

9. Provision of noble metal-containing mixtures according to claim 6, wherein an inorganic material from the group consisting of sodium aluminosilicate, bentonite, zeolite, alumina, expanded clay and cat litter is used as porous material.

10. Provision of noble metal-containing mixtures according to claim 6, wherein an organic, carbon-containing material from the group consisting of activated carbon, wood charcoal, filter charcoal and sawdust is used as porous material.

11. Provision of noble metal-containing mixtures according to claim 1, wherein the container serving as a diffusion barrier for water consists of plastic.

12. Provision of noble metal-containing mixtures according to claim 11, wherein the plastic serving as a diffusion barrier for water is polyethylene (PE) or polypropylene (PP).

13. Provision of noble metal-containing mixtures according to claim 1, wherein the container loaded with the mixture is located on at least one lower refractory mat in the heat-resistant chamber.

14. Provision of noble metal-containing mixtures according to claim 13, wherein the upper and/or a lower refractory mat, on which the container loaded with the mixture is loaded, is a fibre mat composed of glass wool, rockwool or other ceramic insulation materials.

15. Provision of noble metal-containing mixtures according to claim 1, wherein the heat-resistant chamber is made of corrosion-resistant steel.

16. Provision of noble metal-containing mixtures according to claim 15, wherein the heat-resistant chamber is made of chromium-nickel steel with additions of molybdenum.

17. Provision of noble metal-containing mixtures according to claim 1, wherein the heat-resistant chamber has one or more optionally closable ventilation openings.

18. Process for processing noble metal-containing mixtures, wherein the process comprises heating the noble metal-containing mixture prepared according to claim 1.

19. Process according to claim 18, wherein the noble metal-containing mixture being heated is heated to temperatures in the range from 600 to 1050° C.

20. Process according to claim 18, comprising recovering one or more of the noble metals ruthenium, rhodium, palladium, silver, osmium, iridium, platinum or gold.

21. The process according to claim 20, wherein the recovery of one or more of the noble metals is achieved by ashing and without any wet chemical step.

22. Loaded heat-resistant chamber comprising:
   at least one moistened mixture of a noble metal-containing mixture and porous material accommodated in at least one semi-permeable container which serves as a diffusion barrier for water,
   at least one upper refractory mat which covers the semi-permeable container filled with the mixture.

23. Loaded heat-resistant chamber according to claim 22, which further comprises a heat-resistant covering for closing the chamber.

24. Loaded heat-resistant chamber according to claim 22, which further comprises at least one lower refractory mat on which the container containing the mixture is located in the heat-resistant chamber.

25. Provision of noble metal-containing mixtures for a process for processing noble metal-containing mixtures by heating the mixture, wherein the provision comprises:
   moistening of the noble metal-containing mixture to be processed,
   blending of the noble metal-containing mixture with a porous material,
   introduction of the noble metal-containing mixture into at least one container to form a loaded container, wherein the at least one container serves as a diffusion barrier for water,
   introduction of the loaded container into a heat-resistant chamber together with at least one upper refractory mat.

26. Provision of noble metal-containing mixtures according to claim 25, wherein a proportion of the porous material is in the range from greater than 0 to 70% by weight based on the total weight of the mixture without water loading.

27. Provision of noble metal-containing mixtures according to claim 26, wherein the proportion of the porous material is in the range from greater than 0 to 60% by weight based on the total weight of the mixture without water loading.

28. Provision of noble metal-containing mixtures according to claim 25, wherein an inorganic material from the group consisting of sodium aluminosilicate, bentonite, zeolite, alumina, expanded clay and cat litter is used as porous material.

29. Provision of noble metal-containing mixtures according to claim 25, wherein an organic, carbon-containing material from the group consisting of activated carbon, wood charcoal, filter charcoal and sawdust is used as porous material.

30. Provision of noble metal-containing mixtures for a process for processing noble metal-containing mixtures by heating the mixture, wherein the provision comprises:
   moistening of the noble metal-containing mixture to be processed,
   introduction of the moistened noble metal-containing mixture into at least one container to form a loaded container, wherein the at least one container serves as a diffusion barrier for water and consists of plastic,
   introduction of the loaded container into a heat-resistant chamber together with at least one upper refractory mat.

31. Provision of noble metal-containing mixtures according to claim 30, wherein the plastic serving as a diffusion barrier for water is polyethylene (PE) or polypropylene (PP).

32. Provision of noble metal-containing mixtures for a process for processing noble metal-containing mixtures by heating the mixture, wherein the provision comprises:
   moistening of the noble metal-containing mixture to be processed,
   introduction of the moistened noble metal-containing mixture into at least one container to form a loaded container, wherein the at least one container serves as a diffusion barrier for water,
   introduction of the loaded container into a heat-resistant chamber together with at least one upper refractory mat, wherein the at least one upper refractory mat is a fibre mat.

33. Provision of noble metal-containing mixtures according to claim 32, wherein the fibre mat is composed of glass wool, rockwool or other ceramic insulation materials.

34. Provision of noble metal-containing mixtures according to claim 33, wherein the heat-resistant chamber is made of chromium-nickel steel with additions of molybdenum.

35. Provision of noble metal-containing mixtures for a process for processing noble metal-containing mixtures by heating the mixture, wherein the provision comprises:
   moistening of the noble metal-containing mixture to be processed,
   introduction of the moistened noble metal-containing mixture into at least one container to form a loaded container, wherein the at least one container serves as a diffusion barrier for water,
   introduction of the loaded container into a heat-resistant chamber together with at least one upper refractory mat, wherein the heat-resistant chamber is made of corrosion-resistant steel.

36. Provision of noble metal-containing mixtures for a process for processing noble metal-containing mixtures by heating the mixture, wherein the provision comprises:
   moistening of the noble metal-containing mixture to be processed,
   introduction of the moistened noble metal-containing mixture into at least one container to form a loaded container, wherein the at least one container serves as a diffusion barrier for water,
   introduction of the loaded container into a heat-resistant chamber together with at least one upper refractory mat, wherein the heat-resistant chamber has one or more optionally closable ventilation openings.

* * * * *